United States Patent
Sekine et al.

[19]

[11] Patent Number: 5,922,042
[45] Date of Patent: *Jul. 13, 1999

[54] AUTOMATIC RESUMPTION OF ROUTE GUIDANCE IN VEHICLE NAVIGATION SYSTEM

[75] Inventors: Masayuki Sekine; Toshikazu Sakakibara, both of Cupertino, Calif.

[73] Assignee: Visteon Technologies, LLC, Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/722,305

[22] Filed: Sep. 30, 1996

[51] Int. Cl.$^6$ ........................................... G06F 15/50
[52] U.S. Cl. ................................ 701/210; 701/200
[58] Field of Search .................................... 701/200, 208, 701/207, 209, 210; 340/988, 990, 995

[56] References Cited

U.S. PATENT DOCUMENTS

| | | | |
|---|---|---|---|
| 4,660,037 | 4/1987 | Nakamura | 340/990 |
| 4,891,760 | 1/1990 | Kashiwazaki et al. | 364/443 |
| 4,962,458 | 10/1990 | Verstraete | 364/443 |
| 5,231,584 | 7/1993 | Nimura et al. | 364/444 |
| 5,337,244 | 8/1994 | Nobe et al. | 364/449 |
| 5,365,448 | 11/1994 | Nobe et al. | 364/449 |
| 5,369,588 | 11/1994 | Hayami et al. | 364/449 |
| 5,557,522 | 9/1996 | Nakayama et al. | 364/424.02 |
| 5,742,923 | 4/1998 | Odagawa | 701/207 |

FOREIGN PATENT DOCUMENTS

| | | | |
|---|---|---|---|
| 0067672 | 12/1982 | European Pat. Off. | 701/209 |
| 05006716 | 1/1996 | Japan | G08G 1/0969 |
| WO 92/08952 | 5/1992 | WIPO | 701/210 |

OTHER PUBLICATIONS

Buxton et al., The Travelpilot, A Second-Generation Automotive Navigation System, Feb. 1991.

*Primary Examiner*—William A. Cuchlinski, Jr.
*Assistant Examiner*—Arthur D. Donnelly
*Attorney, Agent, or Firm*—Blakely, Sokoloff, Taylor & Zafman LLP

[57] ABSTRACT

An on-board automobile navigation system provides route guidance instructions to a user. The system detects a power-down of the vehicle and, in response, determines whether to resume route guidance in response to the next start-up of the vehicle. This determination is made prior to powering down the system. The determination is based on the current position of the vehicle and the computed route. If a determination was made to resume guidance after start-up, the selected destination and the computed route are saved in memory before powering down the system. If a determination was made to resume guidance, then in response to the next start-up of the vehicle, the selected destination and the computed route of the vehicle are recalled from memory, and route guidance is resumed from the current position of the vehicle.

32 Claims, 5 Drawing Sheets

AUTOMATIC RESUMPTION OF ROUTE GUIDANCE IN VEHICLE NAVIGATION SYSTEM

FIELD OF THE INVENTION

The present invention pertains to the field of vehicle navigation systems. More particularly, the present invention relates to on-board automobile navigation systems for guiding the driver of an automobile to a desired destination.

BACKGROUND OF THE INVENTION

An on-board vehicle navigation system can be useful for assisting the driver of an automobile in navigation. An example of an on-board automobile navigation system is a system which provides the driver with a visual display of a street map of a certain area, using a stored map database, and indicates the position and movement of the vehicle as the vehicle travels. In response to the driver's selecting a destination from the database, the system computes a best route from a starting location to the destination and then provides instructions to the driver to guide the driver to the destination. The instructions are given in the form of recorded or synthesized speech.

Automobile navigation systems like the one described above may use a technique known as "dead reckoning" to estimate the position of the vehicle as the vehicle travels. In dead-reckoning, the heading of the vehicle and the distance traveled from a previously calculated position are first determined based on data received from on-board sensors (e.g., compass and odometer). A new position of the vehicle is then estimated by applying the measured parameters to well-known equations. Dead reckoning is subject to certain sources of error, however, which accumulates as the vehicle travels. Therefore, the estimated position of the vehicle is periodically compared to the street map database and adjusted to correct for such error. The system may also include a high-accuracy positioning system, such as Global Positioning System (GPS) or the like.

Certain problems are associated with automobile navigation systems in the prior art, however. For example, a driver of an automobile in which a navigation system is operating may stop and turn off the automobile before reaching the selected destination. In such cases, the navigation systems in the prior art generally determine whether to resume route guidance (i.e., whether to resume providing instructions to the driver) only after the vehicle is restarted. That is, the decision whether to resume route guidance is made in the start-up routine of the navigation system, which is invoked when the vehicle is restarted. A disadvantage associated with such prior art is that it takes time for the navigation system to recall the desired destination, recompute the best route from the current location of the vehicle, and then determine whether to resume route guidance. The time that this process takes can be annoying to the driver, since the driver may require navigation instructions before proceeding.

In addition, some on-board automobile navigation systems in the prior art generally determine whether or not to resume route guidance based upon the direct (straight line) distance from the current location of the vehicle to the desired destination. In particular, such systems might resume route guidance only if the direct distance to the destination exceeds a predetermined distance. A disadvantage of this technique is that the actual driving distance may be much larger than the direct distance to the desired location. For example, the vehicle may be located physically very close to the selected destination, yet the vehicle may have to travel a significant distance on streets to reach the destination. The result is often a faulty decision on whether to resume guidance.

Hence, what is needed is a technique for reducing the amount of time consumed in the start-up routine of an automobile navigation system, and in particular, reducing the time consumed in determining whether to resume route guidance after a power-down of the system en route. What is further needed is a technique for improving the accuracy of the determination whether to resume route guidance in such cases.

SUMMARY OF THE INVENTION

A method of providing route guidance to a user of a navigation system for a vehicle is provided. Information is initially output to the user for navigation. In response to detecting a power-down of the navigation system, a decision is made before the power-down occurs whether to resume outputting the information following the next power-up of the navigation system.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method of automatically resuming route guidance to a user of a navigation system for a vehicle is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

Figure 1:
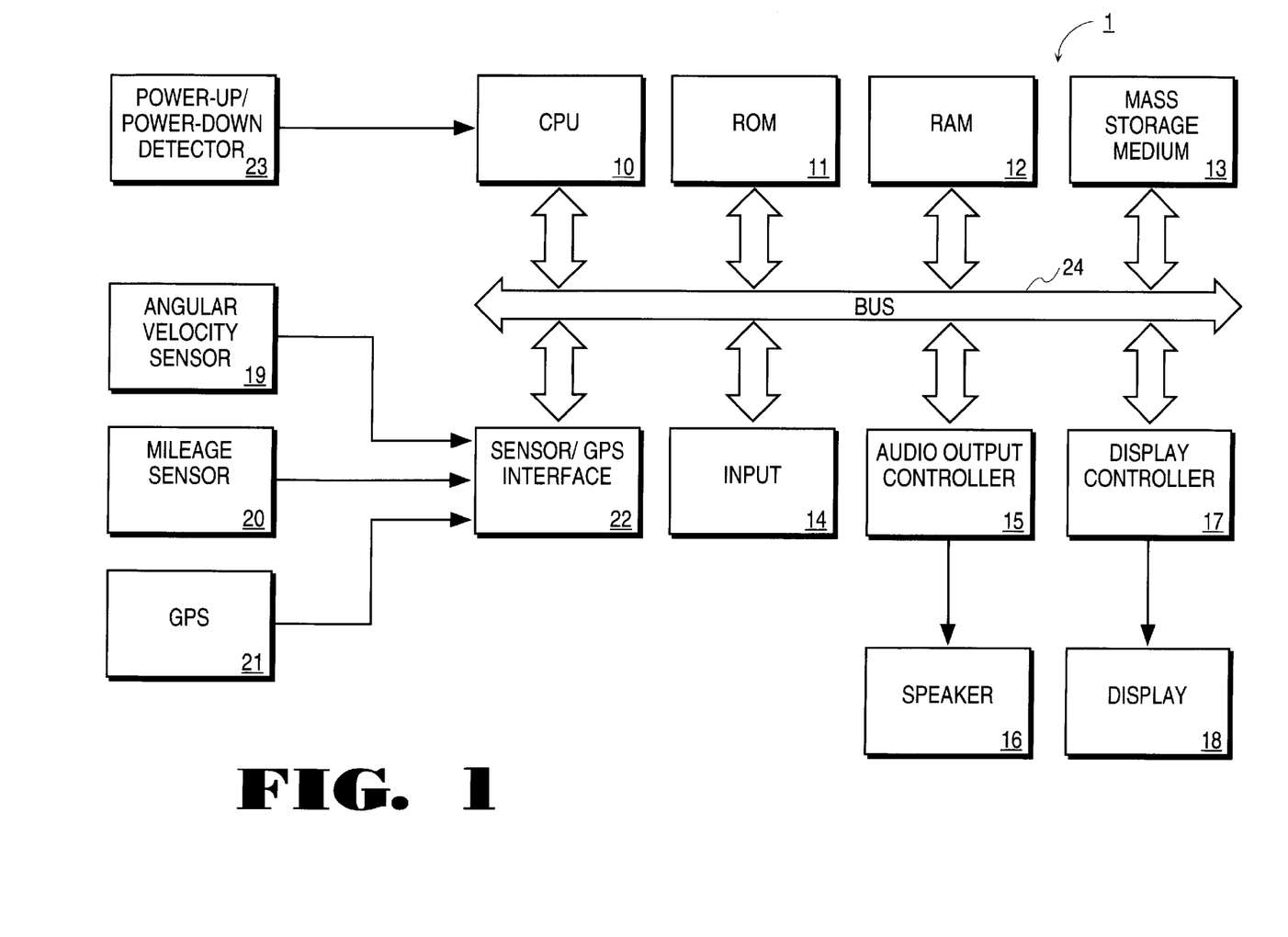
FIG. 1 is a block diagram of an on-board automobile navigation system.

FIG. 1 illustrates a system 1 for assisting a driver or passenger (hereinafter, "user") of an automobile in navigation, in which the present invention is implemented. Generally, the system 1 provides a visual display of a street map of a geographic area and an indication of the position and movement of the vehicle. In response to the user's inputting a desired destination, the system computes a best route from a starting location to the destination and then provides navigation instructions to the driver to guide the driver to the destination. In one embodiment, the user selects the destination from a list of possible destinations provided by the system 1. The navigation instructions are provided in the form of digitized or synthesized speech. The instructions can also be provided visually in an alternate display mode, in which the next maneuver is indicated in the form of an arrow symbol and/or text. The system 1 uses "dead reckoning" in combination with a map-matching algorithm to accurately determine the position of the vehicle on roads of a street map. The street map is provided by a stored map database.

The system 1 includes a central processing unit (CPU) 10, read-only memory (ROM) 11, random access memory (RAM) 12, and a mass storage medium 13, all coupled together by a bus 24. The CPU 10 controls operation of the system 1 by executing instructions stored in either ROM 11, RAM 12, or both. For example, instructions stored in ROM 11 may be copied to RAM 12 for execution by the CPU 10. Mass storage medium 13 stores the map database containing streets and points of interest for a given geographic area.

RAM 12 may include static RAM (SRAM) which receives power from the vehicle's battery to maintain its stored data when the vehicle's engine is off. ROM 11 is non-volatile memory, some or all of which can be erased and reprogrammed. For example, ROM 11 may be flash memory, electrically-erasable programmable ROM (EEPROM), or any other suitable form of programmable-erasable non-volatile memory. Mass storage medium 13 may comprise a magnetic, optical, or other form of non-volatile storage device suitable for storing large quantities of data.

The system 1 also includes several sensors 19, 20, and 21 to provide data for purposes of dead reckoning. In particular, the system 1 includes an angular velocity sensor 19, a mileage sensor (e.g., an odometer) 20, and a Global Positioning System (GPS) locator 21. Each of sensors 19–21 is coupled to an interface 22, which is coupled to the bus 24. Interface 22 includes various circuitry for interfacing sensors 19–21 to the bus 24, such as analog-to-digital converters. The system 1 also includes an input unit 14 that is coupled to the bus 24. The input unit 14 includes various controls such as buttons (which may be mechanical in nature) by which the user can enter commands and data into the system 1, such as when selecting a destination or various output options. The system 1 outputs digitized or synthesized audio navigation instructions to the user via a speaker 16. The speaker 16 is coupled to the bus 24 via an audio output controller 15. A visual display is provided to the user via a display device 18 that is coupled to the bus 24 by a display controller 17. The display device 18 may be a liquid crystal display (LCD), a cathode ray tube (CRT), or any other suitable form of display device.

The system 1 also includes a power-up/power-down detector 23 for detecting a power-up condition or power-down condition of the system 1. That is, detector 23 will detect the vehicle engine being turned on (power-up) or off (power-down). Detector 23 is coupled to provide a signal to CPU 10 indicating such a power-up or power-down condition. The purpose of detector 23 will be described in greater detail below.

Occasionally, a driver of an automobile will stop and turn off the automobile before reaching the selected destination. Prior art automobile navigation systems determine whether or not to resume route guidance in such cases only after the vehicle is powered-up again. This procedure is often time consuming and annoying to the driver. In particular, it takes time to recall the selected destination from memory, recompute the best route from the current location of the vehicle, and then determine whether to resume route guidance. Furthermore, systems in the prior art determine whether or not to resume guidance based upon the direct distance to the selected destination. Because the direct distance can differ significantly from the actual driving distance, such a procedure often results in poor judgments by the system as to whether or not to resume guidance. The present invention overcomes these disadvantages, as will now be described.

In this description, certain routines are described as being performed in response to a power-down of the system 1. It will be recognized that such routines are performed before power is actually removed from the system 1. That is, the system 1 is designed so that if the user turns off the engine of the automobile or simply turns off the system 1, the system 1 will not actually be powered down until after the routines have been completed. The system 1 is therefore provided with power from the vehicle's battery or from a charge storage device within the system 1 in order to complete these routines prior to actually powering down.

Figure 2:
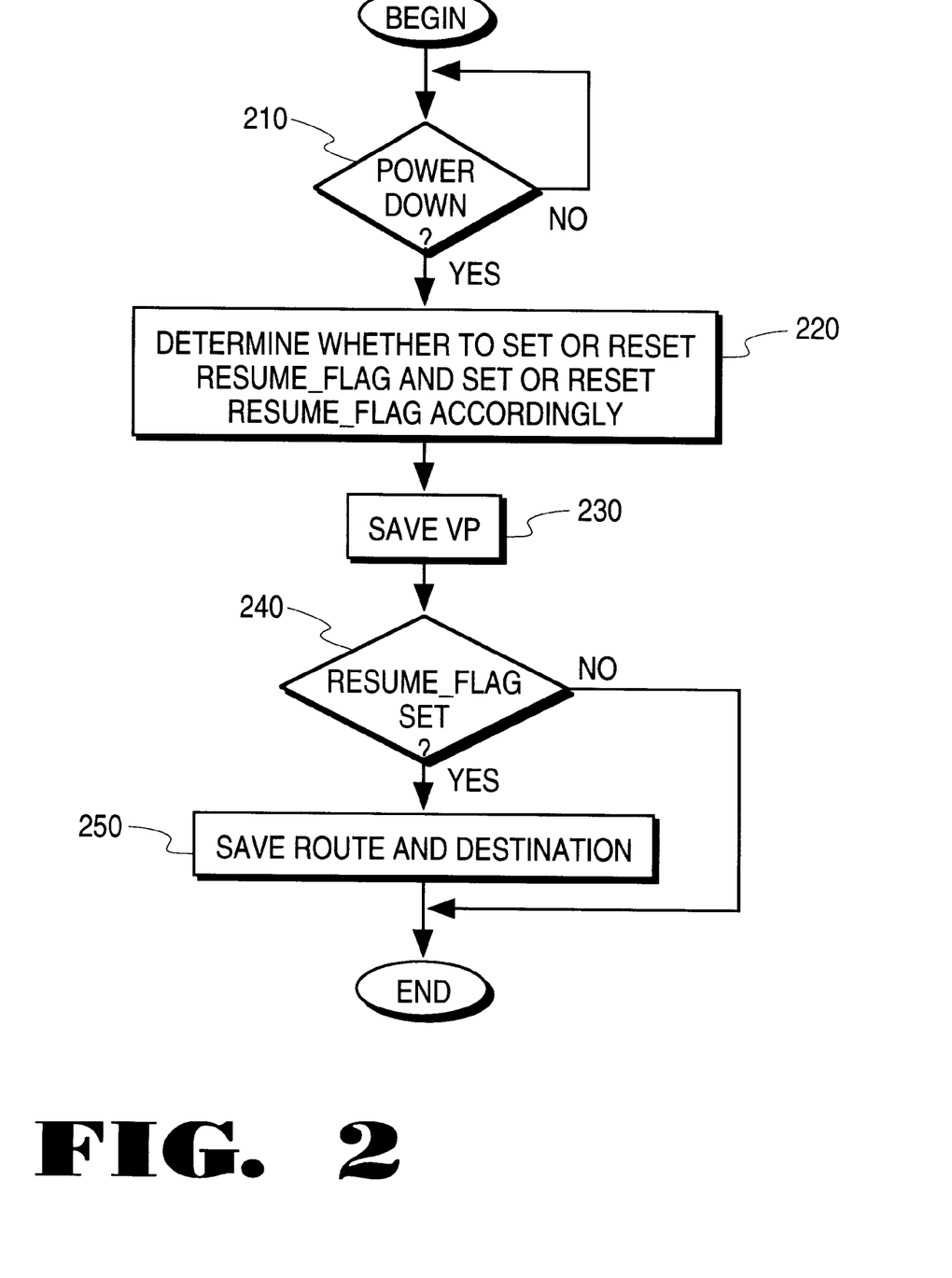
FIG. 2 is a flow diagram illustrating an overall routine for enabling automatic resumption of route guidance upon power-up.

FIG. 2 illustrates a routine performed by the system 1 according to the present invention. The routine of FIG. 2 is performed in response to each power-down of the system 1. In an alternative embodiment, the routine of FIG. 2 may be performed periodically during route guidance, rather than (or in addition to) in response to a power-down.

In response to a power-down of the system 1, as detected by detector 23 (step 210), the system 1 determines whether to set or reset a flag, RESUME_FLAG, and then sets or resets RESUME_FLAG accordingly (step 220). As will be described below, RESUME_FLAG is used by the system 1 upon the next power-up to determine whether to resume route guidance, i.e., whether to resume providing navigation instructions to the user. The manner in which the determination whether to set or reset RESUME_FLAG is made is described in greater detail below.

Following setting or resetting of RESUME_FLAG, the vehicle position, VP, is stored in ROM 11 (step 230). Note that the vehicle position VP is saved to ROM 11 regardless of whether RESUME_FLAG is set, because the system 1 must maintain knowledge of the current position of the vehicle, regardless of whether it will resume providing instructions to the user upon the next power-up. After saving the vehicle position VP, it is determined whether RESUME_FLAG has been set (step 240). If not, the routine ends. If RESUME_FLAG was set, then the selected destination, the current route, and the actual driving distance AD to the destination are stored in the programmable/erasable portion of ROM 11 (step 250). In an alternative embodiment, RAM 12 includes SRAM supported by the vehicle's battery, and the selected destination, the current route, and the actual driving distance AD are stored in the SRAM rather than in ROM 11. In another alternative embodiment, these parameters are instead stored in the mass storage medium 13.

In general, the user selects the destination, and the system 1 computes the best route, when the vehicle is started. However, the user may also initiate route guidance by selecting a destination at any time during operation of the vehicle. The precise method of inputting the destination and computing the best route are not germane to the present invention and are therefore not described herein.

Figure 3:
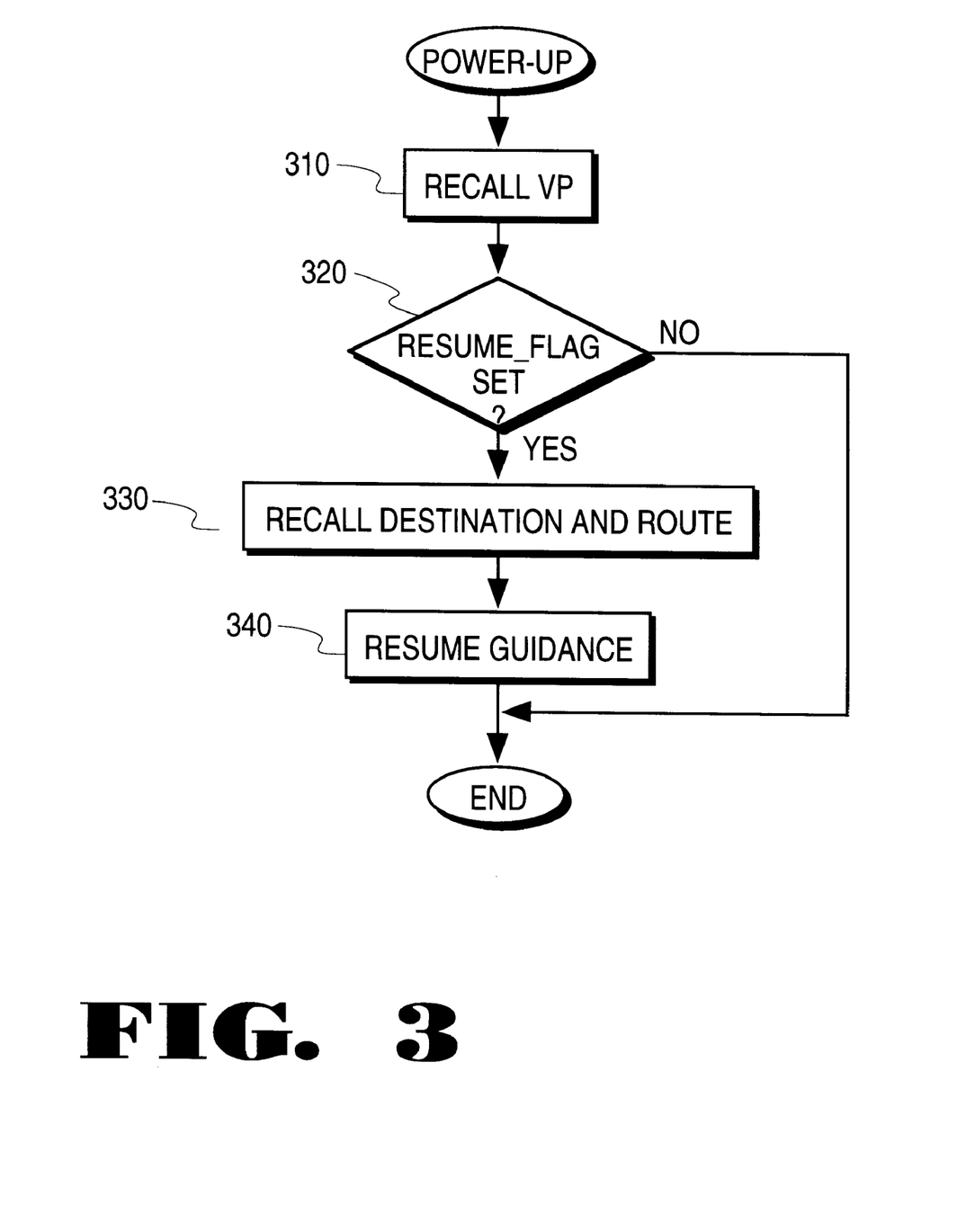
FIG. 3 is a flow diagram illustrating automatic resumption of route guidance upon power-up.

In response to a power-up of the system 1, the routine of FIG. 3 is performed by the system 1. Note that other routines are performed on power-up by the system 1, which are not relevant to the present invention and are therefore not described herein. Initially, the vehicle position VP is retrieved from ROM 11 (step 310). Next, the status of RESUME_FLAG is checked (step 320). If RESUME_FLAG is not set, then the routine ends, i.e., route guidance is not resumed. If RESUME_FLAG is set, then the previously-selected destination, route data, and an actual driving distance AD to the selected destination are recalled from ROM 11 (step 330). These parameters are then used by the system 1 in resuming providing navigation instructions (step 340) from the location along the computed route at which the system 1 was powered-down. Note that a decision (step 340) to resume route guidance is subject to confirmation that the user wishes route guidance to be resumed. Such confirmation can be obtained using a simple prompt to the user.

Figure 4:
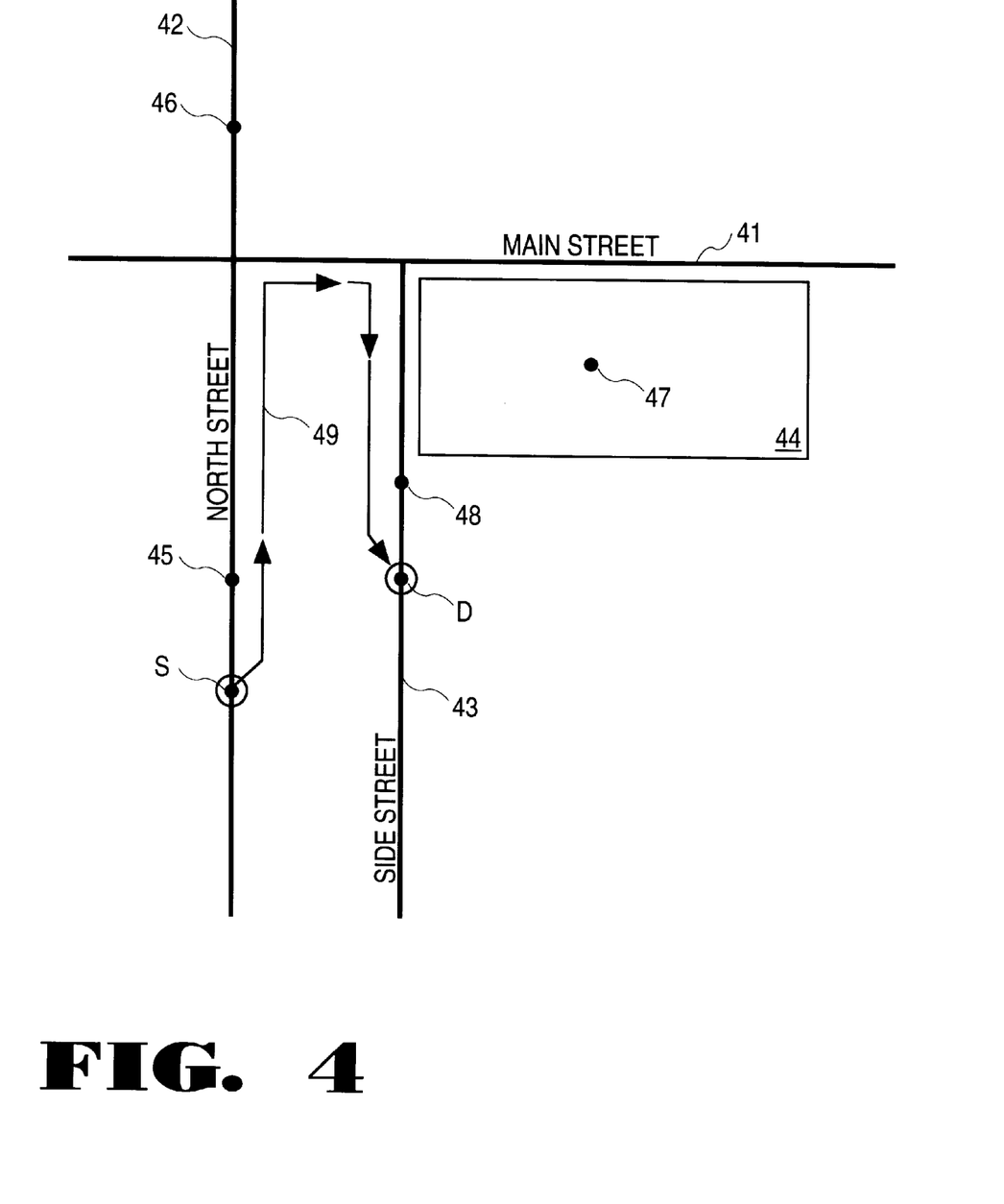
FIG. 4 illustrates possible positions of a vehicle within a geographic area.
Figure 5:
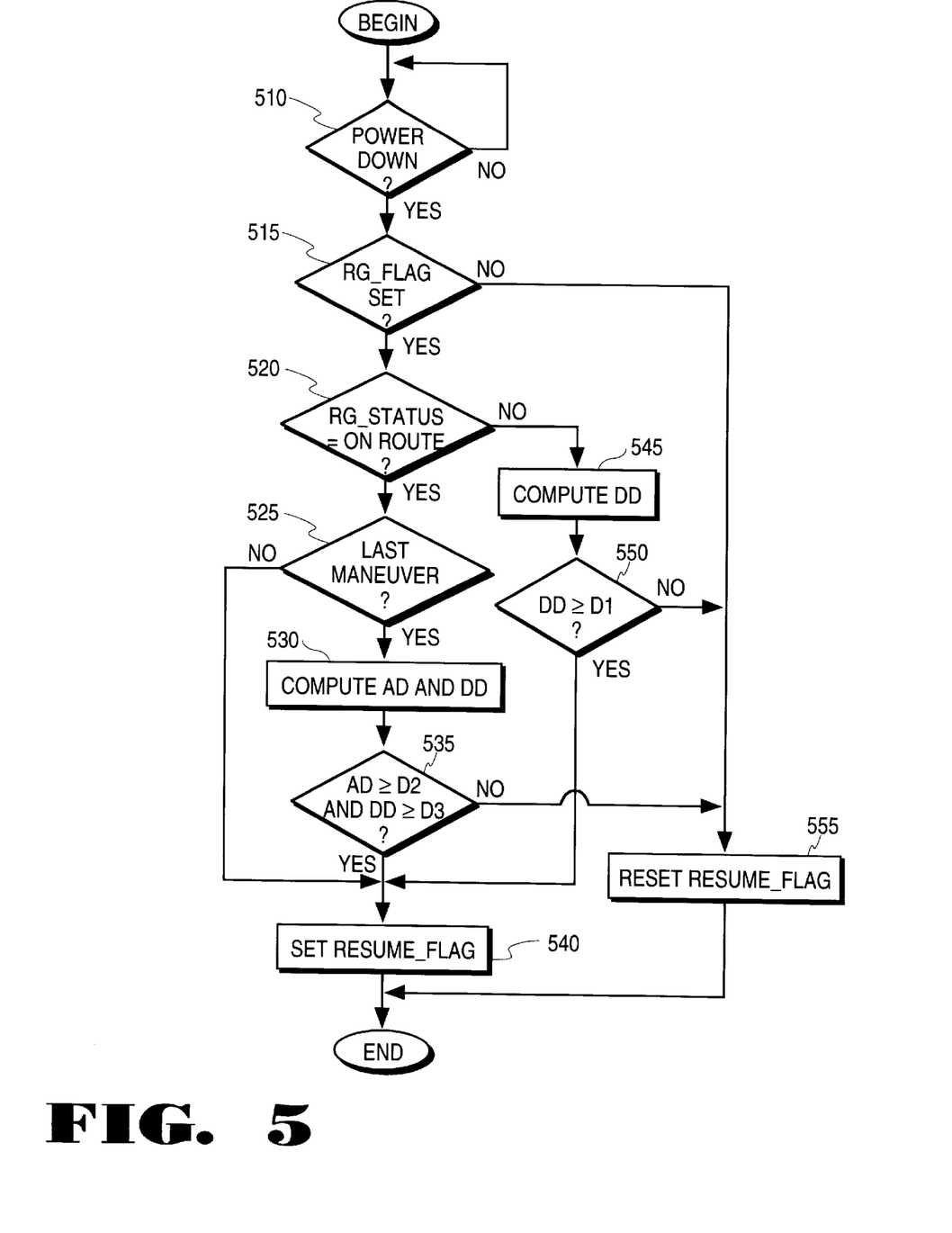
FIG. 5 is a flow diagram illustrating a routine performed before power-down for determining whether to resume guidance after power-up.

The precise manner in which the decision is made whether or not to resume guidance on power-up is described now with reference to FIGS. 4 and 5. FIG. 4 illustrates an example of a geographic area through which a vehicle including the system 1 may travel. The area includes several streets 41–43, namely North Street 42, Main Street 41, and Side Street 43. Assume that the vehicle is initially located at a starting position S on North Street 42. Assume further that the user inputs a location D on Side Street 43 into the system 1 as the desired destination. In response, the system 1 computes a route shown by line 49 from the starting point S to the desired destination D.

During route guidance, the position of the vehicle, as maintained by the system 1, has a status at each point in time. This status is stored in the form of a variable, RG_STATUS, which may correspond to a register in memory. For example, the vehicle may be on the computed route, as it should be, as indicated by point 45 in FIG. 4. Alternatively, the vehicle may be off the computed route but on a road, as when the user has missed a turn; this case is indicated by point 46 in FIG. 4. In a third case, the vehicle may be off the computed route and not on any road (or not on a road included in the map database). For example, the vehicle may be in a parking lot 44, as indicated by point 47 in FIG. 4. A fourth significant case for purposes of the present invention, is when the vehicle is on the computed route and the vehicle has completed the last required maneuver (i.e., the last turn computed by the system 1) before reaching the selected destination.

Each of these possible cases are stored in terms of the variable RG_STATUS. The precise status of RG_STATUS is used to determine whether or not to set or reset RESUME_FLAG, as will now be described with reference to FIG. 5.

FIG. 5 illustrates a routine performed in response to each power-down of the system 1, for determining whether to set or reset RESUME_FLAG. The result of the routine of FIG. 5 is used by the routine of FIG. 3 on the next power-up following the power-down. When a power-down of the system 1 is detected by detector 23 (step 510), a determination is made of whether the system 1 is currently performing route guidance (providing navigation instructions to the user). This determination is made by checking the status of a second flag, RG_FLAG (step 515). RG_FLAG always remains set while route guidance is in progress. If RG_FLAG is not set when its status is checked (in step 515), then RESUME_FLAG is reset (step 555). As a result, upon the next power-up, the system 1 will not resume route guidance, as discussed in connection with FIG. 3. If RG_FLAG is set when its status is checked, however, then a determination is made of whether RG_STATUS indicates that the vehicle is on the computed route (step 520). If the vehicle is not on the computed route, then the direct (straight line) distance DD from the current position of the vehicle to the selected destination is computed (step 545). If the direct distance DD is greater than or equal to a predetermined threshold distance D1 (step 550), then RESUME_FLAG is set (step 540). If the direct distance DD falls below the threshold distance D1, then RESUME_FLAG is reset (step 555).

If RG_STATUS indicated (in step 520) that the vehicle is on the computed route, then it is determined whether the vehicle has completed its last maneuver, i.e., the last maneuver dictated by the system 1 (step 525). If the vehicle has not completed its last maneuver, then RESUME_FLAG is set (step 540). If the vehicle has completed its last maneuver, then the system 1 computes the actual driving distance AD (i.e., distance along the computed route) from the current position of the vehicle to the selected destination and the direct distance DD to the selected destination (step 530). If the actual driving distance AD equals or exceeds a predetermined threshold distance D2, and the direct distance DD equals or exceeds a predetermined threshold distance D3 (step 535), then RESUME_FLAG is set (step 540). Otherwise, RESUME_FLAG is reset (step 555).

Note that in contrast with the prior art, both the actual driving distance AD and the direct distance DD are used (step 530), rather than only the direct distance DD, if the vehicle is on the computed route. The result is a more accurate decision of whether to resume guidance than if the decision were based only on the direct distance DD to the destination. For example, if the user were to shut off the vehicle's engine at point 45 in FIG. 4, a system of the prior art might improperly decide not to resume guidance upon power up, because the direct distance DD from point 45 to the destination D is relatively short. The present invention avoids such mistakes.

Hence, the present invention shortens the startup time required by the system 1 after a power-down which takes place during route guidance; that is, determining whether to resume route guidance before the system is actually powered-down, time is saved later upon power-up. In addition, because the route data and actual driving distance to the destination are saved prior to power-down and used in this determination, a more accurate determination can be made as to whether to resume route guidance.

Thus, a method of automatically resuming route guidance to a user of a navigation system for a vehicle has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a navigation system for a vehicle, a method of providing route guidance to a user, the method comprising:

outputting information to the user for navigation of the vehicle;

detecting an impending power-down of the navigation system; and     in response to detecting the impending power-down, deciding before the power down occurs, whether to resume said outputting following a next power up of the navigation system based on a current position of the vehicle.

2. A method according to claim 1, wherein said deciding comprises deciding whether to resume said outputting based on the current position of the vehicle and a selected destination.

3. A method according to claim 2, wherein said deciding further comprises deciding whether to resume said outputting based on a distance from the current position of the vehicle to the selected destination along the current route.

4. A method according to claim 1, further comprising storing the current route and the selected destination in a memory before the power-down of the navigation system occurs, if it was decided to resume said outputting.

5. A method according to claim 4, further comprising storing a flag in the memory, the flag indicating a result of said deciding, the method further comprising checking a status of the flag in response to the next power-up of the navigation system to determine whether to resume said outputting.

6. A method according to claim 4, further comprising:
   if it is decided to resume said outputting, then in response to the next power-up of the navigation system:
      recalling the selected destination and the current route of the vehicle from the memory; and
      resuming said outputting as part of a route guidance routine.

7. In a navigation system for an automobile, a method of providing route guidance to a user of the navigation system, the method comprising:
   performing a route guidance routine, the route guidance routine including providing guidance information to the user;
   receiving a power-down signal corresponding to an impending powering down of the navigation system;
   in response to the power-down signal, determining whether to resume the route guidance routine in response to a next powering up of the automobile based on a current position of the automobile and a selected destination;
   storing route information in a memory before the powering down of the navigation system if a determination was made in the determining step to resume the guidance routine, the route information including a selected destination and a current route of the automobile; and
   if a determination was made in the determining step to resume the guidance routine, then in response to the next powering up of the automobile:
      recalling the selected destination and the current route of the automobile from the memory; and
      resuming the route guidance routine.

8. A method according to claim 7, wherein the guidance information comprises instructions to the user for guiding the automobile along the current route to the selected destination.

9. A method according to claim 8, wherein said deciding comprises deciding whether to resume the route guidance routine based on a distance from the current position of the automobile to the selected destination along the current route.

10. A method according to claim 8, wherein said determining comprises storing a flag in the memory, the flag indicating whether a decision was made to resume the route guidance routine in response to the next powering up of the automobile, the method further comprising:
    checking a status of the flag in response to the next powering up of the vehicle; and
    performing said recalling and said resuming depending on the status of the flag.

11. An apparatus for providing route guidance to a user of a navigation system for a vehicle, the apparatus comprising:
    means for detecting an impending powering down of the vehicle; and
    means for determining, in response to detecting the impending powering down of the vehicle and before a next powering down of the navigation system, whether to resume a route guidance routine in response to a next powering up of the vehicle based on a current position of the vehicle and a user-selected destination.

12. An apparatus according to claim 11, wherein the route guidance routine comprises a routine for providing information to the user for assisting the user in navigating the vehicle to the user-selected destination along a current route of the vehicle computed by the navigation system.

13. An apparatus according to claim 11, wherein the means for determining comprises means for deciding whether to resume the guidance routine based on a distance along the current route from the current position of the vehicle to the user-selected destination.

14. An apparatus according to claim 12, further comprising means for storing the current route and the destination in a memory before the next powering down of the navigation system, if the means for determining determines to resume the guidance routine in response to the next powering up of the vehicle.

15. An apparatus according to claim 14, wherein the means for determining further comprises means for storing a flag in the memory, the flag corresponding to an output of the means for determining, the apparatus further comprising means for checking a status of the flag in response to the next powering up of the navigation system to determine whether to resume outputting information to the user for assisting the user in navigating the vehicle.

16. An apparatus according to claim 14, further comprising means for recalling, in response to the next powering up of the navigation system, the user-selected destination and the current route of the vehicle from the memory and resuming the route guidance routine, if the status of the flag indicates a decision was made to resume the route guidance routine.

17. A navigation system for a vehicle, comprising:
    a processor;
    a first storage unit coupled to the processor; and
    a second storage unit coupled to the processor, the second storage unit having computer instructions stored therein which, when executed by the processor, cause the processor to:
       perform a guidance routine including providing guidance information to the user, the guidance routine including providing navigation instructions to a user of the navigation system;
       detect an impending power-down of the navigation system;
       in response to detection of the impending power-down, decide whether to resume the guidance routine following a next power-up of the navigation system based on a current position of the vehicle and a user-selected destination; and
       store the user-selected destination and a computed route of the vehicle in the first memory before the power-down of the navigation system occurs if a decision was made to resume the guidance routine.

18. A navigation system according to claim 17, wherein the computer instructions further comprise computer instructions which, when executed by the processor, cause the processor to, if a decision was made to resume the guidance routine following the next power-up of the navigation system,
    respond to the next power-up of the navigation system by recalling the user-selected destination and the computed route of the vehicle from the first memory and resume the guidance routine.

19. A navigation system according to claim 17, wherein the navigation instructions comprise instructions to the user for guiding the vehicle along the current route to the user-selected destination.

20. A navigation system according to claim 19, wherein the computer instructions for causing the processor to decide whether to resume the guidance routine further comprise:

computer instructions which, when executed by the processor, cause the processor to decide whether to resume the guidance routine based on a distance from the current position of the vehicle to the user-selected destination along the computed route.

21. A navigation system according to claim 17, wherein the computer instructions further comprise computer instructions which, when executed by the processor, cause the processor to:

store a flag in the first memory, the flag indicating whether a decision was made to resume guidance in response to a next power-up of the navigation system;

check a status of the flag in response to the next power-up of the vehicle; and perform the recalling step and the resuming step, depending on the status of the flag.

22. A method according to claim 2, wherein said deciding further comprises deciding whether to resume said outputting based on a selected route, the current position of the vehicle, and the selected destination.

23. A method according to claim 2, wherein said deciding further comprises deciding whether to resume said outputting based on a direct distance between the current position of the vehicle and the selected destination.

24. A method according to claim 8, wherein said deciding comprises deciding whether to resume the route guidance routine based on a direct distance from the current position of the automobile to the selected destination.

25. An apparatus according to claim 12, wherein the means for determining comprises means for deciding whether to resume the guidance routine based on a distance from the current position of the vehicle to the user-selected destination.

26. An apparatus according to claim 25, wherein the means for determining comprises means for deciding whether to resume the guidance routine based on a direct distance from the current position of the vehicle to the selected destination.

27. In an automobile navigation system, a method of assisting a driver of an automobile in navigating, the method comprising:

outputting route guidance information based on a computed route;

detecting an impending power-down of the navigation system; and in response to detecting the impending power-down, deciding before the power-down occurs, whether to resume said outputting in response to a next power-up of the navigation system, based on a distance between a current position of the automobile and a user-selected destination.

28. A method according to claim 27, wherein said deciding comprises deciding whether to resume said outputting based on a direct distance from the current position of the automobile to the user-selected destination.

29. A method according to claim 27, wherein said deciding comprises deciding whether to resume said outputting based on a distance from the current position of the automobile to the user-selected destination along the computed route.

30. A method according to claim 27, further comprising storing the computed route and the user-selected destination in a memory before the power-down of the navigation system occurs, provided it was decided to resume said outputting.

31. A method according to claim 27, further comprising storing a flag in the memory, the flag indicating a result of said deciding, the method further comprising checking a status of the flag in response to the next power-up of the navigation system to determine whether to resume said outputting.

32. A method according to claim 27, further comprising:

if it is decided to resume said outputting, then in response to the next power-up of the navigation system:

recalling the user-selected destination and the computed route of the automobile from the memory; and resuming said outputting.

* * * * *